United States Patent
Ickinger

(10) Patent No.: US 7,112,056 B2
(45) Date of Patent: Sep. 26, 2006

(54) PLASTICIZING UNIT WITH AN ELECTROMOTIVE SPINDLE DRIVE FOR AN INJECTION MOLDING MACHINE

(75) Inventor: Georg Michael Ickinger, Graz (AT)

(73) Assignee: Demag Ergotech GmbH, Schwaig (DE)

( * ) Notice: Subject to any disclaimer, the term of this patent is extended or adjusted under 35 U.S.C. 154(b) by 0 days.

(21) Appl. No.: 10/689,572

(22) Filed: Oct. 20, 2003

(65) Prior Publication Data

US 2004/0131723 A1 Jul. 8, 2004

Related U.S. Application Data

(63) Continuation of application No. PCT/EP02/04231, filed on Apr. 17, 2002.

(30) Foreign Application Priority Data

Apr. 19, 2001 (AT) .................. A 632/2001

(51) Int. Cl.
B29C 45/50 (2006.01)
(52) U.S. Cl. .................. 425/542; 425/574
(58) Field of Classification Search .......... 425/574, 425/577, 542, 556
See application file for complete search history.

(56) References Cited

U.S. PATENT DOCUMENTS

| | | | |
|---|---|---|---|
| 4,601,653 A | | 7/1986 | Inaba .................. 425/587 |
| 4,676,730 A | * | 6/1987 | Yamasaki .............. 425/569 |
| 5,804,224 A | * | 9/1998 | Inaba et al. ............ 425/150 |
| 5,980,235 A | | 11/1999 | Eppich et al. .......... 425/542 |
| 6,524,095 B1 | * | 2/2003 | Ito et al. ............... 425/574 |
| 2002/0132026 A1 | * | 9/2002 | Maurilio ................. 425/574 |

FOREIGN PATENT DOCUMENTS

| | | |
|---|---|---|
| EP | 0 512 139 A1 | 11/1992 |
| FR | 2 739 428 | 4/1997 |
| JP | 03 231823 A | 10/1991 |
| JP | 03 277521 A | 12/1991 |
| JP | 07077210 A | 3/1995 |
| JP | 2000213616 A | 8/2000 |
| WO | WO 97/34757 | 9/1997 |

* cited by examiner

Primary Examiner—Joseph S. Del Sole
Assistant Examiner—Emmanuel S. Luk
(74) Attorney, Agent, or Firm—Henry M. Feiereisen

(57) ABSTRACT

An actuating drive for a plasticizing unit of an injection molding machine is disclosed. The actuating drive includes a spindle drive with an electric motor and a control mechanism. An energy storage device is coupled with the spindle drive for force transmission therebetween. The energy storage device is loaded by the spindle drive in a return stroke phase and is unloaded in a forward feed phase, boosting the power of an electric motor. The actuator drive can be used, for example, for pulsating actuation of a mold ejector of the injection molding machine, significantly reducing the electrical energy consumption compared to conventional drives.

9 Claims, 2 Drawing Sheets

PLASTICIZING UNIT WITH AN ELECTROMOTIVE SPINDLE DRIVE FOR AN INJECTION MOLDING MACHINE

CROSS-REFERENCES TO RELATED APPLICATIONS

This application is a continuation of prior filed copending PCT International application no. PCT/EP02/04231, filed Apr. 17, 2002, on which priority is claimed under 35 U.S.C. §120, the disclosure of which is hereby incorporated by reference.

This application claims the priority of Austrian Patent Application, Serial No. A 632/01, filed Apr. 19, 2001, pursuant to 35 U.S.C. 119(a)-(d), the disclosure of which is incorporated herein by reference.

BACKGROUND OF THE INVENTION

The present invention relates to an actuating drive for a plasticizing unit of an injection molding machine, and more particularly to an actuating drive with a spindle drive for pulsating actuation of a mold ejector to reduce the electrical energy consumption of the spindle drive.

International patent publication WO 97/34757 describes a spindle drive operating as an actuating drive for an injection molding machine. The actuating drive includes an electric motor and, for relieving the electric motor in the feed phase, an energy storage device in the form of a compression spring assembly arranged in parallel with the electric motor. The load on the compression spring assembly increases during the return stroke of the spindle drive, whereas the spring force continuously decreases during the spindle forward feed stroke in conformance with the characteristic spring curve. However, the relief provided by the energy storage device is significantly reduced in that the characteristic spring curve of the energy storage device does not conform to the force and speed requirements of a plasticizing drive which can vary significantly depending on the stroke and can therefore negatively effect the total energy consumption of the drive unit. If the spindle drive is used as an actuating drive for the plasticizing screw, then the spindle drive has to be held by the electric motor at the return stroke position during the time between mold filling and injection process, counteracting the then maximum forward feed force of the energy storage device. Moreover, the motor also has to supply the force difference required for building up the necessary counter-pressure in the initial phase of the mold filling process, i.e., in the region of the forward stroke position of the plasticizing screw, where the spring force is minimal. The same applies when a spindle drive of this type is used as an actuating drive for the entire plasticizing unit: while the plasticizing unit is stopped in the return stroke position, the spindle drive has to be held by the electric motor in a stationary state against the maximum spring force. The electric motor also has to generate the injection force of the injection nozzle on the sprue bush of the injection tool during the entire duration of the injection process when the plasticizing unit is in the forward feed position. As a result, the compression spring assembly reduces the power required by the electromotive spindle drive only in a limited way.

It would therefore be desirable and advantageous to provide an improved plasticizing unit of simple construction, which obviates prior art shortcomings and is able to specifically reduce the power requirements of the electromotive spindle drive.

SUMMARY OF THE INVENTION

According to one aspect of the present invention, an actuating drive for a plasticizing unit of an injection molding machine includes a spindle drive with a stationary housing section and an electric motor with a drive element. The spindle drive further includes a control mechanism arranged between the drive element and the housing section, and an energy storage device coupled with the spindle drive for force transmission therebetween. The spindle drive loads the energy storage device in a return stroke phase of the spindle drive and unloads the energy storage device in a feed phase of the spindle drive, whereby unloading of the energy storage device boost the power of the electric motor. The control mechanism operates in parallel with the energy storage device to actively modify an effective actuating force of the energy storage device dependent on a stroke position of the spindle drive.

The energy storage device is a mechanical device which essentially stores kinetic energy. According to the invention, the effective actuating force of the energy storage device is intentionally adjusted by a simple control mechanism so that the spindle drive can be held stationary in an arbitrary stroke position, in particular in the forward (feed) or return stroke in position, by the electric motor without consuming energy. Alternatively or in addition, an adjustable positive or negative force difference, depending on the stroke direction, can be produced—again without activating the electric motor—between the spring force of the energy storage device. The spring force is defined by the spring constants and the effective actuating force exerted by the energy storage device in conjunction with the control mechanism. The spindle drive meets the overall variable speed and force requirements of an actuating drive for the plasticizing unit of an injection molding machine without adding significant construction and energy costs.

According to an advantageous feature of the invention, the control mechanism can include a variably adjustable force coupling arranged between the drive element to which the stored force is applied, and the housing section of the spindle drive. The coupling can also include a brake which can be activated depending on the stroke excursion, or a selectively releasable locking device, or an impulse-controlled releasable locking device in form of a coupling or a selectively releasable one-way lock.

Since the control mechanism does not alter the characteristic spring curve of the energy storage device, a variable spring pretension can advantageously be preset to adapt the energy storage device to plasticizing units having different configurations.

According to another advantageous feature of the invention, the spindle drive can control a stroke motion between a plasticizing cylinder and a plasticizing screw. The control mechanism can include a friction brake that selectively locks the energy storage device at a stroke end position and, at the beginning of a filling phase of the plasticizing cylinder, impedes a return stroke force of the plasticizing screw and opposes said loading of the energy storage device.

According to yet another advantageous feature of the invention, the spindle drive can control a stroke of the plasticizing unit relative to a mold closing unit. The control mechanism can then further include a selectively releasable locking device capable of automatically locking the drive element, which is biased by the energy storage device, relative to the stationary housing in at least one stroke end position of the plasticizing unit.

Advantageously, the energy storage device can include a compression spring assembly with an adjustable spring pretension and/or a disk spring assembly which secures the spindle rod of the spindle drive against rotation relative to the drive element in the form of a spindle nut coupled to the spindle rod and thus secures the spindle nut against rotation relative to the stationary housing.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
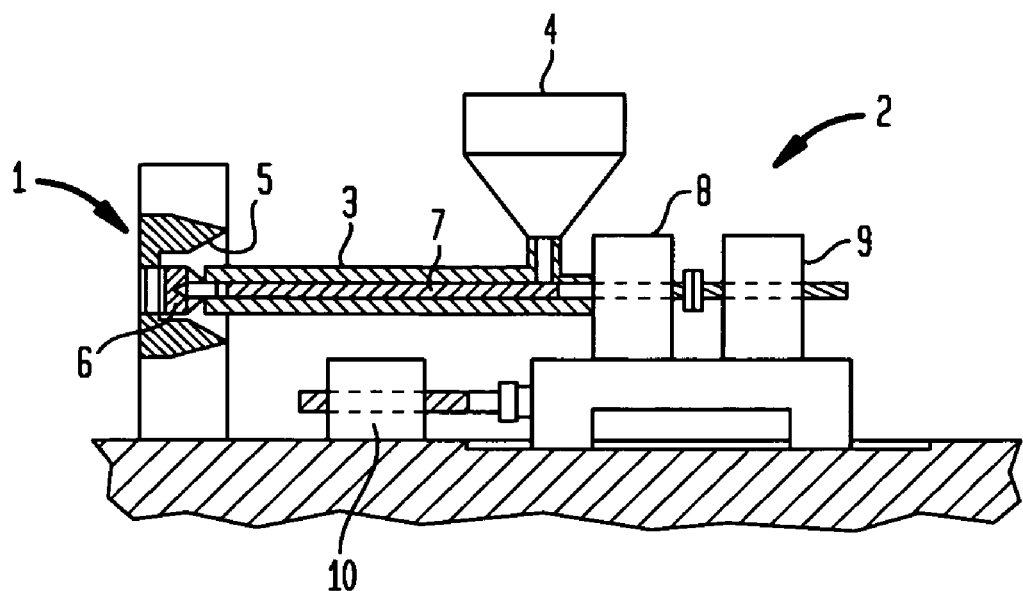
FIG. 1 shows a plasticizing unit of an injection molding machine with a spindle drive for stroke control of the plasticizing unit and another spindle drive for controlling the screw stroke.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

This is one of two applications both filed on the same day. Both applications deal with related inventions. They are commonly owned but have different inventive entity. Both applications are unique, but incorporate the other by reference. Accordingly, the following U.S. patent application with Ser. No. 10/689,555 is hereby expressly incorporated by reference: "Injection Molding Machine with an Electromotive Spindle Drive and a Spring-Based Energy Storage Device for Supporting the Electric Motor".

Turning now to the drawing, and in particular to FIG. 1, there is shown an injection molding machine with a closing unit 1 (only shown in part in FIG. 1) and a plasticizing unit 2 which can move linearly on a machine bed in the direction of the closing unit 1. The plasticizing unit 2 includes a plasticizing cylinder 3 with a fill funnel 4 and an injection nozzle 6 which is disposed on the front cylinder end and which is during the injection and dwell pressure phase resiliently and sealingly pressed against the sprue opening 5 of the closing unit 1. The injection molding machine further includes a plasticizing screw 7 disposed in the plasticizing cylinder 3 for rotation and for axial displacement therebetween. The rotation of the plasticizing screw 7 is controlled by a rotary drive 8, whereas the linear motion is controlled by an actuating drive 9. An additional actuating drive 10 controls the stroke motion of the plasticizing unit 2 on the machine bed.

Figure 2:
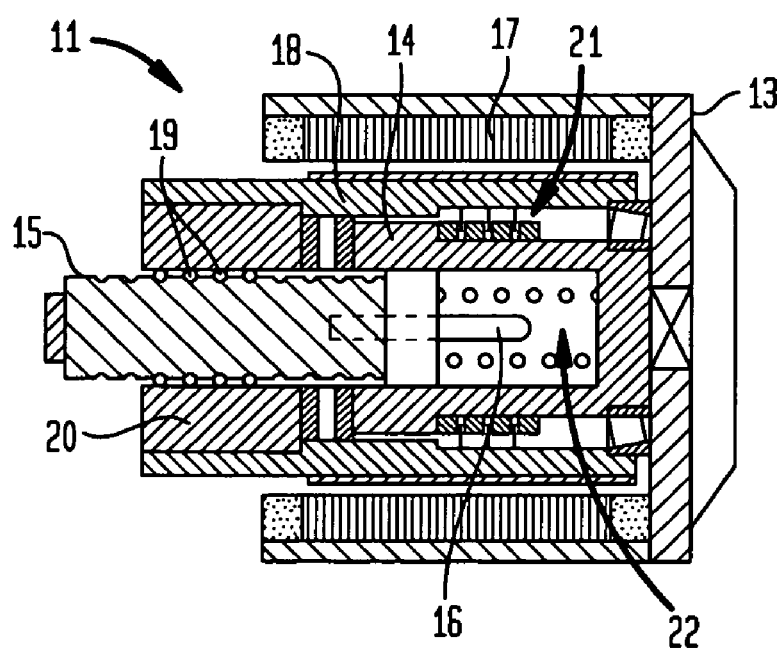
FIG. 2 depicts a first embodiment of a spindle drive.
Figure 3:
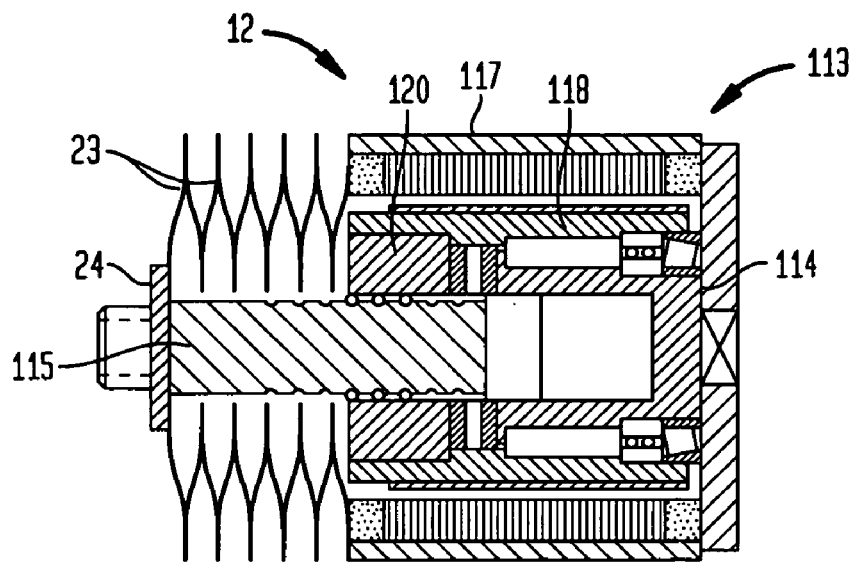
FIG. 3 depicts a second embodiment of a spindle drive.

Both actuating drives 9, 10 are implemented as electromotive spindle drives and illustrated in detail in FIGS. 2 and 3. The spindle drive 11 (FIG. 2) is controls the stroke of the plasticizing screw 7, whereas the spindle drive 12 (FIG. 3) controls the stroke of the plasticizing screw 2.

The spindle drive 11 includes a stationary housing section 13 with a receiving element 14. A spindle rod 15 is displaceable in the receiving element 14 in a longitudinal direction, but prevented from rotating for example by keyways 16. The spindle drive 11 further includes an electrically excited stator 17 which together with the rotor 18 which is rotatably supported in the receiving element 14 forms the electromagnetic drive section of the spindle drive 11. A spindle nut 20, which is coupled with the spindle rod 15 by rolling bearing balls 19, is attached to the rotor 18. A control mechanism 21 in the form of a friction brake, which regulates the braking force, is disposed between the rotor 18 and the receiving element 14. An energy storage device, which consists of a compression coil spring 22 and affects the spindle rod 15 in the forward feed direction, is disposed in the receiving element 14. During the spindle advance, the energy storage device boosts the force produced by the electromotive drive section 17, 18, and is loaded again by the drive section during the return stroke of the spindle rod 15.

Figure 4:
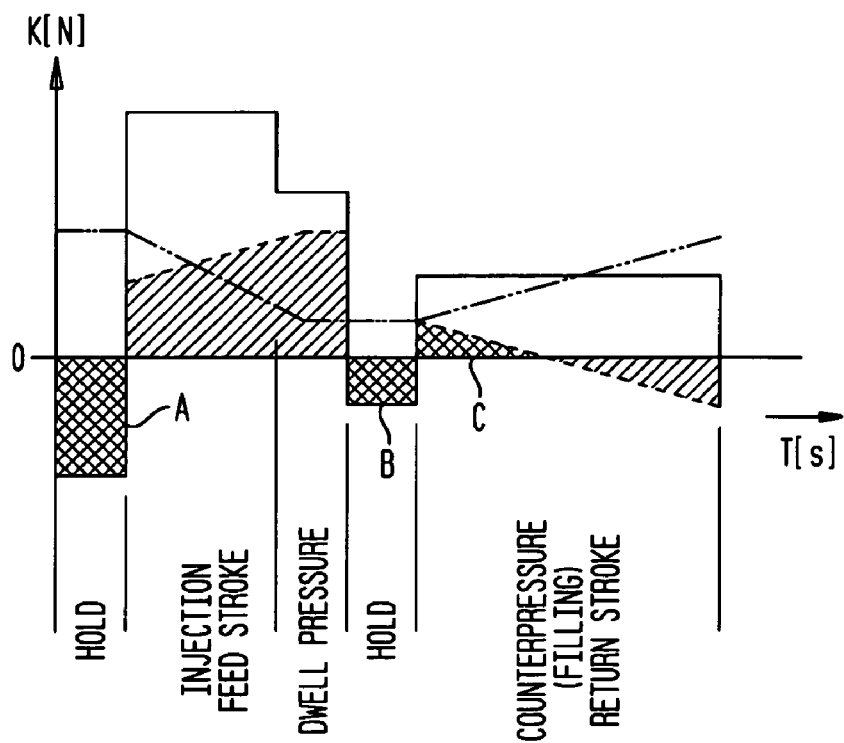
FIG. 4 shows schematically a force curve of a spindle drive for controlling the screw stroke of a plasticizing unit in successive operating phases with the corresponding electromotive and energy storage force contributions.

The force curve of the spindle drive 11 is shown schematically in FIG. 4. The thrust force K of the spindle rod 15 is indicated by a solid line, the force contribution of the electric motor 17, 18 is indicated by a dashed line, and the characteristic spring curve of the energy storage device 22 is indicated by a dash-dotted line. At the end of the plasticizing phase, the plasticizing screw 7 is held by the spindle rod 15 against the maximum stored force of the fully loaded energy storage device 22 in the return stroke position. If the required holding force were supplied by the electric motor 17, 18, this would require an electric energy contribution A (shown as a crosshatched area). This energy contribution A, however, is obviated by the combination of the energy storage device 22 and the friction brake 21 which is actuated in the holding phase, thereby locking the spindle drive and preventing stroke motion. The injection phase commences when the brake 21 is released, causing the spindle rod 15 and hence the plasticizing screw 7 to be displaced under the additive force generated by the compression spring 22 and the electric motor 17, 18, whereby the forward feed force matches the required high injection pressure. The compression spring 22 is then relieved and the energy consumption of the electric motor 17, 18 increases accordingly. The contributions from the electromotive force and force stored in the energy storage remain approximately constant during the dwell pressure phase following the feed stroke motion.

The plasticizing screw 7 is held against the residual tension of the energy storage device 22 in the forward (feed) position, without hitting the limit stop, by a holding force that is again produced not by the electric motor 17, 18, but by the friction brake 21, so that the electric energy contribution B is also eliminated.

The plasticizing screw 7 moves during the filling phase and plasticizing phase from the forward (feed) stroke position into the return stroke position, whereby the spindle drive 11 has to generate an essentially constant counterpressure which counteracts the force produced by the return stroke of the screw drive. At the beginning of the screw return stroke, i.e. when the energy storage device 22 is relieved and the stored force is insufficient to produce the counterpressure, the missing force contribution is produced by a controlled brake actuation that diminishes with the increasing force from the energy storage device. This is again accomplished without assistance by the electric motor 17, 18, thus also eliminating the otherwise required electric energy contribution C. The electric motor 17, 18 has to be activated only when the spring force exceeds the required counterpressure, in order to reduce the effective stored force to the required counterpressure by increasingly loading the energy storage device 22, until the spindle drive 11 is again in its initial position at the end of the return stroke motion.

The difference between the spindle drive 12 depicted in FIG. 3 and the first embodiment depicted in FIG. 2 resides mainly in a differently configured energy storage device. In the following description, parts corresponding with those in FIG. 2 will be identified, where appropriate, by corresponding reference numerals increased by "100". The spindle drive 12 of FIG. 3 is implemented as a disk spring assembly 23, which not only helps boosting the power of the electric motor 117, 118, but also non-rotatably couples the spindle rod 115 with the stator 117 on the housing side of housing 113 due to the torsional stiffness of the disk spring assembly 23. The pretension of the spring can be adjusted by an adjusting nut 24, allowing the amplification effect of the disk spring assembly 23 to be individually adapted to the power requirements of the respective spindle drive 12. Moreover, a releasable locking device, which is controlled by impulses and is disposed between the rotor 118 and the receiving element 114, is used instead of the friction brake which can control the braking power. In the engaged state, the releasable locking device transfers the spring force exerted on to the spindle rod 115 to the receiving element 114 by way of the spindle nut 120 and the rotor 118. The releasable locking device is formed as a switchable coupling or as a one-way lock which is effective in the feed direction of the spindle rod 115, but is freewheeling in the return stroke direction. As mentioned above, the spindle drive 12 is particularly suited for controlling the stroke of the plasticizing unit 2 between the injection and return stroke positions. In other aspects, the construction and operation of the spindle drive 12 of FIG. 3 corresponds essentially to that of the first embodiment depicted in FIG. 2, with the exception of the counterpressure control.

It will be understood that the mechanical control mechanism 21 can also be arranged between the spindle rod 15, 115 and a housing section, or between the spindle rod 15, 115, respectively, and the corresponding spindle nut 20, 120.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. An actuating drive for a plasticizing unit of an injection molding machine, comprising:

a spindle drive operatively connected to the plasticizing unit and having a stationary housing section and an electric motor with a drive element, said spindle drive moving between a first end position corresponding to a feed phase of the spindle drive and a second end position corresponding to a return stroke phase of the spindle drive; and an energy storage device coupled with the spindle drive for force transmission therebetween, said energy storage device receiving energy from the spindle drive in the return stroke phase and transferring energy to the spindle drive in the feed phase;

said transferred energy boosting power of the electric motor, wherein the spindle drive includes a control mechanism arranged between the drive element and the housing section and engaging with the drive element to actively control the force transmitted between the energy storage device and the spindle drive depending on a stroke position of the spindle drive.

2. The actuating drive of claim 1, wherein the control mechanism includes an adjustable force coupling between the drive element and the housing section.

3. The actuating drive of claim 2, wherein the adjustable force coupling comprises a brake which is activated depending on a stroke excursion, or a selectively releasable locking device.

4. The actuating drive of claim 3, wherein the locking device is implemented as a coupling.

5. The actuating drive of claim 3, wherein the locking device is implemented as a selectively releasable one-way locking device.

6. The actuating drive of claim 1, wherein the spindle drive controls a stroke motion between a plasticizing cylinder and a plasticizing screw, and wherein the control mechanism comprises a friction brake that selectively locks the energy storage device at the first end position corresponding to a filling phase of the plasticizing cylinder.

7. The actuating drive of claim 1, wherein the spindle drive controls a stroke of the plasticizing unit relative to a mold closing unit, the control mechanism further comprising a selectively releasable locking device capable of automatically locking the drive element relative to the stationary housing in at least one of the first and second end positions.

8. The actuating drive of claim 1, wherein the energy storage device includes a compression spring assembly with an adjustable spring pretension.

9. The actuating drive of claim 1, wherein the spindle drive includes a spindle rod coupled to the drive element, said energy storage device including a disk spring assembly which secures the spindle rod against rotation.

* * * * *